United States Patent
Hoppal et al.

(10) Patent No.: US 6,377,590 B1
(45) Date of Patent: Apr. 23, 2002

(54) APPARATUS AND METHOD FOR ADAPTIVE DELAY MITIGATION OF VOICE COMMUNICATION

(75) Inventors: Thomas Jake Hoppal, Gilbert; Thomas Chu, Chandler; Murali Ranganathan, Chandler; Darryl Sale, Chandler, all of AZ (US)

(73) Assignee: Motorola, Inc., Schaumburg ( * ) Notice: Subject to any disclaimer, the term of this patent is extended or adjusted under 35 U.S.C. 154(b) by 0 days.

(21) Appl. No.: 09/088,032

(22) Filed: Jun. 1, 1998

(51) Int. Cl.$^7$ .............................. H04J 3/12; H04B 1/10; G10L 21/00

(52) U.S. Cl. ..................... 370/528; 704/226; 455/220

(58) Field of Search ............... 455/67.1, 212, 455/218, 219, 220, 222, 312, 200.1; 704/226, 229, 215, 227; 370/528, 473, 465, 468

(56) References Cited

U.S. PATENT DOCUMENTS

| | | | | |
|---|---|---|---|---|
| 5,054,078 A | * | 10/1991 | Schorman et al. | 381/110 |
| 5,148,429 A | * | 9/1992 | Kudo et al. | 370/473 |
| 5,477,542 A | * | 12/1995 | Takahara et al. | 370/473 |
| 5,678,221 A | * | 10/1997 | Cahill | 455/312 |
| 5,983,080 A | * | 11/1999 | Gerszberg et al. | 455/67.3 |
| 6,032,048 A | * | 2/2000 | Hartless et al. | 455/506 |
| 6,044,147 A | * | 3/2000 | Hollier | 379/338 |

* cited by examiner

*Primary Examiner*—Alpus H. Hsu
*Assistant Examiner*—Afsar M. Qureshi
(74) *Attorney, Agent, or Firm*—Frank J. Bogacz

(57) ABSTRACT

An apparatus (30) and method minimize voice delay by combining comfort noise with subframe insertions to fill gaps in speech and maintain a minimum delay for packets arriving late. When a packet is late, short durations of sound are repetitively inserted until the late packet arrives. When the late packet finally arrives, the durations of future speech pauses are modified so there is no voice degradation.

7 Claims, 2 Drawing Sheets

APPARATUS AND METHOD FOR ADAPTIVE DELAY MITIGATION OF VOICE COMMUNICATION

TECHNICAL FIELD

The invention relates to voice communication systems and methods and, in particular, to an apparatus and method for minimizing end to end voice delay while transmission delay varies.

BACKGROUND OF THE INVENTION

"Source processing delay" is the time required to convert a source sound to packets. "Transmission delay" is the delay between when a packet is sent from a source and when it is received at a destination. "Destination processing delay" is the time required to convert packets back into sound. "Voice delay" is the sum of source processing delay, transmission delay and destination processing delay.

In ideal digital communication systems, transmission delay is constant and voice packets arrive at regular intervals to allow for continuous reconstructed speech at the destination. However, most digital communication systems do not exhibit a regular arrival of packets due to changes in delay associated with voice packet routing. This variation in transmission delay becomes more problematic in satellite communication systems due to large transmission delays and the large transmission delay fluctuations.

With fixed-voice packet timing, packets are expected at regular intervals. If usable packets do not arrive at the expected time due to an increase in delay or excessive bit errors, there has to be a prediction what the speech might have been, or the voice output has to be muted since there is no data from which to generate speech. In addition, when the packets arrive early, they have to be buffered until they would normally be used. This time the packets wait in the buffer is called buffer delay. Buffer delay increases the voice delay for these packets.

Previous digital systems added enough delay to the system to mitigate the worst case transmission delay variations. Other proposed solutions include adaptively scaling the duration of output speech during both speech and pause segments. Most current terrestrial systems do not have to compensate for large changes in transmission delay and often choose to add small amounts of buffer delay. The only known approaches are those used by GSM (Global Satellite Mobile), USDC (United States Digital Cellular) and JDC (Japan Digital Cellular).

Since these approaches are inadequate for mitigating the effects of large transmission delay variations, there is a significant need for a delay mitigation scheme that maintains a minimum end to end voice delay when voice packet transmission delays fluctuate.

DETAILED DESCRIPTION OF THE INVENTION

The present invention minimizes voice delay to provide higher speech quality. The preferred embodiment of the invention combines subframe insertion with frame scaling to fill gaps in speech due to late arriving packets and maintain a minimum delay for early arriving packets. When a packet is late, short durations of comfort noise are inserted into the audio stream until the packet arrives. When the late packet finally arrives, the time durations of future speech pauses are modified or eliminated. These speech pause duration changes result in a necessary timing correction without introducing voice degradation. One of the key aspects of the invention is to only make timing changes during gaps (e.g., pauses) in speech.

A "satellite" as used throughout this description means a man-made object or vehicle which orbits the earth at non-geostationary altitudes (e.g., low-earth or medium-earth altitudes) or geostationary altitudes. A "constellation" means a number of satellites arranged in orbits for providing specified coverage (e.g., radio communication, remote sensing, etc.) of a portion, portions or all of the earth. A constellation typically includes multiple rings (or planes) of satellites and can have an equal number of satellites in each plane, although this is not essential.

Figure 1:
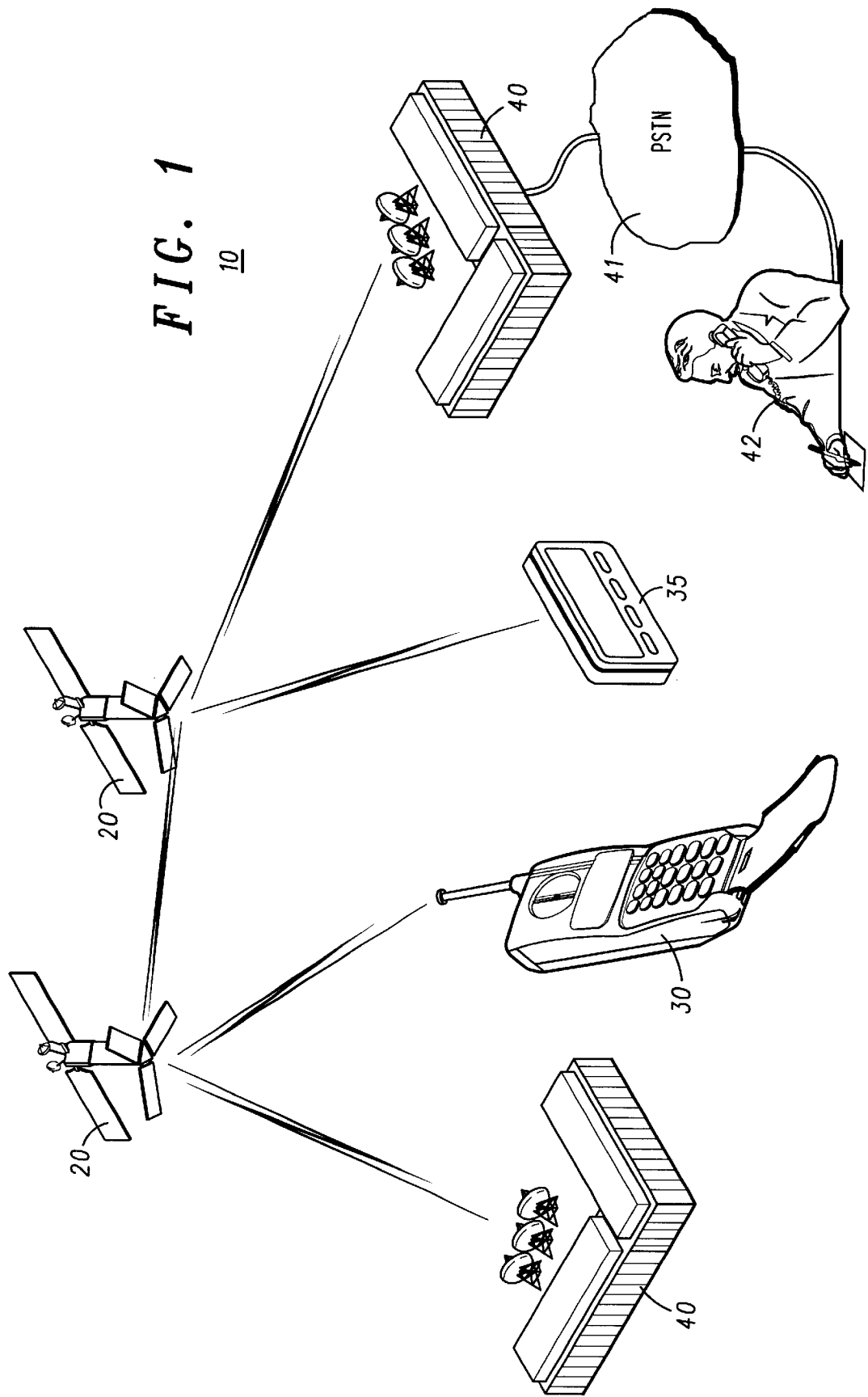
FIG. 1 shows a satellite communication system according to a preferred embodiment of the invention.

FIG. 1 shows a satellite communication system according to a preferred embodiment of the invention. Although FIG. 1 illustrates a highly simplified diagram of communication system 10, system 10 comprises a number of satellites 20, any number of subscriber units 30 and any number of base stations 40. Generally, communication system 10 including satellite 20, subscriber unit 30 and base station 40, can be viewed as a network of nodes. All nodes of communication system 10 are or can be in data communication with other nodes of communication system 10 through communication links. In addition, all nodes of communication system 10 are or can be in data communication with other telephonic devices dispersed throughout the world through public switched telephone networks 41 (PSTNs) and/or conventional terrestrial communication devices coupled to PSTN 41 through conventional terrestrial base stations.

Although the present invention is applicable to space-based communication systems 10 having at least one satellite 20 in low-earth or medium-earth orbit, satellite 20 is preferably part of a number of satellites in low-earth orbit around the earth. However in alternative embodiments, satellite 20 can be a medium-earth orbit satellite. Satellite 20 can be in the same satellite network, or can be in different satellite networks, including for example, the Iridium® network, the Celestri™ network or the Globalstar® network. If they are in different satellite networks, one network can be designated as a primary satellite network, while the other satellite network can be designated as a secondary satellite network.

Each satellite 20 communicates with other adjacent satellites 20 through cross-links in the preferred embodiment of the present invention. These cross-links form a backbone of space-based satellite communication system 10. Thus, a call or communication from one subscriber unit located at any point on or near the surface of the earth can be routed through a satellite or a constellation of satellites to within range of substantially any other point on the surface of the earth. A communication can be routed down to a subscriber unit (which is receiving the call) on or near the surface of the earth from another satellite 20. It is well known to those of ordinary skill in the art how satellite 20 physically communicates with subscriber units 30 and base stations 40. In alternative embodiments, if there are no cross-links, one satellite 20 can communicate with another satellite 20 via routing the call through base station 40.

Subscriber units 30 can be located anywhere on the surface of earth or in the atmosphere above earth. Communication system 10 can accommodate any number of subscriber units 30. Subscriber units 30 are preferably communication devices capable of transmitting and receiving data. The data can of any type, including alphanumeric or numeric for example. By way of example, subscriber units 30 can be a satellite telephone or pager 35. Moreover, subscriber units 30 do not have to be mobile or moving, but can be fixed in one location for an extended period of time.

How subscriber units 30 physically transmit data to and receive data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band, K-Band and/or S-band frequency channels but can encompass Frequency Division Multiple Access (FDMA) and/or Time Division Multiple Access (TDMA) and/or Code Division Multiple Access (CDMA) communication or any other combination thereof. Other methods can be used as are known to those of ordinary skill in the art.

Base station 40 communicates with and controls satellites 20. Base station 40 can be additionally responsible for receiving packets of data or other types of information from satellite 20. How base stations 40 physically communicate with satellites 20 and/or subscriber units 30 is well known to those of ordinary skill in the art. Base station 40 can additionally be connected to a PSTN 41.

Base stations 40 provide certain basic services within satellite communication system 10. They provide control of access to the system for subscribers for whom a base station is "home", e.g., where information is stored about the subscribers, including information to authenticate the subscriber's identity and what services are available to the subscriber. The base stations 40 also provide system subscribers with access to PSTN 41, and it provides PSTN customers 42 with access to system subscribers through the satellite network.

Figure 2:
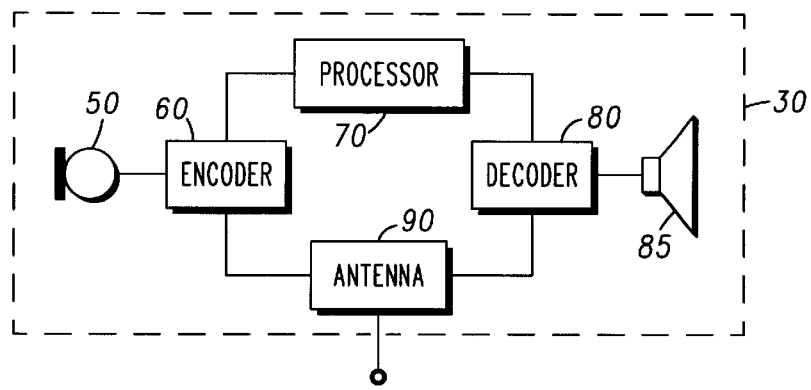
FIG. 2 shows a highly simplified diagram of a subscriber unit according to a preferred embodiment of the invention.

FIG. 2 shows a highly simplified diagram of a subscriber unit according to a preferred embodiment of the invention. Subscriber unit 30 comprises microphone 50, encoder 60, processor 70, decoder 80, speaker 85 and antenna 90. As shown in FIG. 2, microphone 50 is coupled to encoder 60. Encoder is coupled to processor 70 and to antenna 90. Decoder 80 is also coupled to processor 70 and antenna 90. Speaker 85 is coupled to decoder 80. These parts shown in FIG. 2 are well known to those skilled in the art and are commercially available. The parts shown in FIG. 2 can also be part of base station (40, FIG. 1) for receiving and transmitting voice packets.

Voice or sound is transmitted by microphone 50 to encoder 60. Encoder 60 digitizes the voice and produces samples of the speech. The samples can then be compressed, but that is not essential to the present invention. The compressed voice data is grouped into subframes. In the preferred embodiment, there are four subframes per frame. In alternative embodiments, the number of subframes per frame can be more or less than four. One frame represents one packet of voice data. When there is enough voice data for one frame, the frame is transmitted by subscriber unit 30 via antenna 90 to a satellite, a basestation, another subscriber unit or any other device which is able to receive the packet. In alternative embodiments, the packet is transmitted over cable or optical fibers to the intended destination and hence, antenna 90 is not needed.

When packets are being sent from another source to subscriber unit 30, decoder 80 receives packets via antenna 90. The bits are decompressed and converted from digital speech to an analog signal where it is transmitted to speaker 85.

Although reference will be made to source and destination devices, those of ordinary skill in the art recognize that these devices can be subscriber units, satellites, basestations, any combination of these, or any other type of communication devices. A device and an apparatus are identical terms for purposes of this invention.

When a packet is transmitted from an encoder of a source device to when it is received at a decoder of a destination device, the packet can be delayed by a variety of different types of delay. Well known types of delay are range delay, time slot delay and network routing delay. Range delay is the time it takes for the packet to travel between a point on earth and a satellite. Range delay varies due to satellite motion and due to pre-correction at the subscriber unit or base station and causes transmission and reception times at the subscriber unit or base station to vary slowly.

Network routing delay is the delay from the time the first satellite supporting the call receives the packet until it arrives at the last satellite. Routing delays vary according to constellation and satellite design. Changes in delay values can result in transmit time variation, missing packets and even packet reordering.

Figure 3:
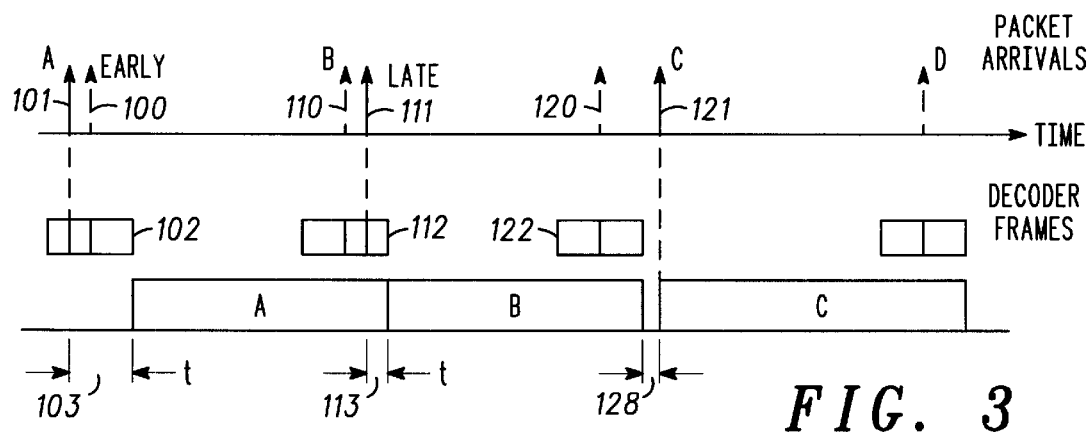
FIG. 3 shows an example of three packets arriving at different times.

FIG. 3 shows an example of three packets arriving at three different arrival times. In the first example, packet A is expected at time 100 but actually arrives early at time 101. Packet B is expected at time 110 but arrives late at time 111. Packet C is expected at time 120 but also arrives late at time 121.

Early packet A and late packet B can be stored in a holding buffer. The holding buffer stores a packet for varying amounts of time. In the preferred embodiment, the holding buffer has a predetermined amount of delay (e.g., 27 msec). This is based on system delay budgets to accommodate varying delays.

The amount of delay can be thought of as an arrival window to accommodate both some early packets and some late packets. Packets A, B, and C are expected to arrive within arrival windows 102, 112, and 122, respectively. For example, in FIG. 3, packet A arrives early and waits in the holding buffer for time delay 103 until it is played. Time delay 103 is the delay between when packet A actually arrives until it is decoded. Since packet B arrives late, it spends less time (e.g., time delay 113) than packet A waiting in the holding buffer before being used. No readjustment in timing is performed for packets A and B. Although this technique does not affect voice quality, it increases delay, and therefore is best suited for mitigating small delay changes.

If a packet arrives outside the window, for example packet C shown in FIG. 3, the late arrival causes gap 123 in speech. There are a variety of techniques for filling gap 123 with noise or another sound. One such technique is called subframe insertion and is useful in situations when a packet's delay variation is unknown in advance and the holding buffer is unable to compensate for a packet's extra long delay. To mitigate the potential gap in speech due to a missing packet, subframe insertions can be used. Subframe insertions allow sound (e.g., static, white noise or some other type of sound) to be generated or created even when no packet has been received. Since the decoder does not know when a missing packet will ultimately arrive, subframe insertions are repeatedly performed until one arrives.

The length of the subframe insertion is preferably 22.5 msec. However, those of ordinary skill in the art recognize that shorter or longer lengths of time could be used as well.

Subframe insertion inserts a predetermined amount of data for a predetermined amount of time in situations (1) where the decoder has to reproduce speech pauses (e.g., due to the absence of sound from a person who is silent or not speaking into the microphone), or (2) where packets are not received in time and gaps in speech would result if subframe insertions are not performed. Speech pauses can also be reproduced by the encoder generating a special packet which indicates that no one is speaking. This special packet conserves bandwidth because it is sent occasionally. Even though subframe insertions can insert too much speech or noise, once the packet arrives, the excess speech or noise can be determined and removed in future speech pauses by frame scaling future subframe insertions.

Suppose packet C arrives late by a certain time period ("Tlate") which is greater than the length of the arrival window but less than the predetermined length of time for a subframe insertion ("Tlength"). Since packet C is so late, a subframe insertion occurs. Thus, the amount of excess sound inserted due to the subframe insertion ("Texcess") is equal to Texcess=(Number of subframe insertions×Tlength)–Tlate. To restore a minimum voice delay condition, sound of duration Texcess must be removed in the future. This removal can be accomplished by modifying, scaling or adjusting the duration of a future subframe insertion by an amount equal to Texcess.

Suppose packet C arrives late by a certain time period ("Tlate") which is greater than the duration of a subframe insertion ("Tlength") but less than the duration of two subframe insertions. Thus, the amount of excess sound inserted due to the subframe insertions is equal to Texcess=(2×Tlength)–Tlate. As before, to restore a minimum voice delay condition, sound of duration Texcess must be removed in the future. In the preferred embodiment, the duration of Texcess is removed by scaling one subframe insertion. In alternative embodiments, the duration of Texcess can be removed by scaling more than one subframe insertion, where the total amount scaled across the number of subframe insertions is equal to Texcess. Moreover, if more than one subframe insertion is used, each subframe insertion does not have to be scaled by the same amount. For example, is Texcess=10 msec, one subframe insertion may be scaled by 6 msec while another subframe insertion is scaled by 4 msec.

Since it is one of the purposes of the preferred embodiment of the invention to scale the duration of a subframe insertion by Texcess only during future voice pauses, additional subframe insertions may occur before this scaling can be performed. Since a Texcess value is determined for each set of subframe insertions followed by a late packet arrival, multiple Texcess values can be accumulated into a total Texcess. When a voice pause is received, a minimum voice delay condition will be restored by modifying future subframe insertions to eliminate the total Texcess. These functions can be performed by the decoder or by the processor executing a software program or by these two parts interfacing with each other.

For example, suppose packet C arrived late by 13 msec (Tlate=13 msec), the arrival window is equal to 10 msec and Tlength is equal to 20 msec. Packet C arrived outside of the arrival window since Tlate>than the length of the arrival window. Since the arrival window cannot compensate for such a late packet, a subframe insertion is performed. In this case, Texcess=7 msec, and the duration of a future subframe insertion will be reduced by 7 msec.

Suppose packet C arrived late by 32 msec (Tlate). Further suppose the subframe insertion's length or Tlength is equal to 20 msec. Subframe insertions are performed until the packet arrives. Thus, two consecutive subframe insertions are required to fill the gap due to the late arriving packet. In this case, Texcess=(2*20)–32=8 msec. This excess of 8 msec must then be removed in a later subframe insertion.

There are many important advantages of the present invention. One of the advantages is the minimization of slurs in speech due to repeating frames or the late arrival of packets. A second advantage is the minimization of creating gaps in speech due to late voice packet arrival.

Accordingly, it is intended by the appended claims to cover all modifications of the invention which fall within the true spirit and scope of the invention.

What is claimed is:

1. A subframe insertion method for mitigation the effects of changes in transmission delay in a fixed voice, packet timing communication system, comprising the steps of:
    inserting at least one subframe for a first predetermined period of time until a late packet arrives;
    determining a second period of time corresponding to a measure of how late the late packet arrived;
    determined a third period of time corresponding to the extent to which said first predetermined period of time exceeds the second period of time; and
    modifying at least one future speech pause by said third period of time to restore a minimum voice delay condition.

2. A method as recited in claim 1, wherein the step of inserting includes the step of inserting at least one subframe of sound until the late packet arrives.

3. A method as recited in claim 1, wherein the step of inserting includes the step of inserting at least one subframe of noise until the late packet arrives.

4. A method as recited in claim 1 wherein the of modifying includes the step of scaling a plurality of subframe insertion by a part of the amount of said third period of time, where a total amount scaled is equal to said third period of time.

5. A subscriber unit mitigating the effects of changes in transmission delays of voice packets comprising:
    an antenna;
    a decoder coupled to the antenna for inserting at least one sound subframe for a first predetermined period of time until a late packet arrives, determining a second period of time corresponding to a measure of how late the late packet arrived, determining a third period of time corresponding to the extent to which said first predetermined period of time exceeds said second period of time, and modifying at least one future speech pause by said third period of time to restore a minimum voice delay condition;
    an encoder coupled to the antenna; and
    a processor coupled to the decoder and the encoder.

6. A subscriber unit as recited in claim 5, wherein the decoder generates noise until the late packet arrives.

7. A subscriber unit as recited in claim 5, wherein the decoder scales a plurality of subframe insertions by a part of the amount of said third period of time, where a total amount scaled is equal to said third period of time.

* * * * *